United States Patent [19]

Staar

[11] 3,810,238

[45] May 7, 1974

[54] DICTATING MACHINE USING A MULTI-TRACK MAGNETIC STRIP AND HAVING A PHASING CONTROL MEANS

[76] Inventor: Marcel Jules Helene Staar, 479, Avenue Louise, Brussels, Belgium

[22] Filed: Apr. 24, 1972

[21] Appl. No.: 246,927

[30] Foreign Application Priority Data

Apr. 23, 1971 Belgium .............................. 766204

[52] U.S. Cl. 179/100.2 MD, 179/100.2 CA, 274/4 J

[51] Int. Cl. .......................................... G11b 15/18

[58] Field of Search........... 179/100.2 T, 100.2 MD, 179/100.2 S, 100.2 R, 100.1 DR, 100.2 CA; 274/4 J

[56] References Cited

UNITED STATES PATENTS

| | | | |
|---|---|---|---|
| 2,468,198 | 4/1949 | Heller | 179/100.2 MD |
| 2,683,568 | 7/1954 | Lindsay | 179/100.2 S |
| 3,641,279 | 2/1972 | Ganske | 179/100.2 MD |

FOREIGN PATENTS OR APPLICATIONS

| | | | |
|---|---|---|---|
| 1,146,666 | 4/1963 | Germany | 179/100.2 CA |

*Primary Examiner*—Vincent P. Canney
*Assistant Examiner*—Robert S. Tupper
*Attorney, Agent, or Firm*—Eric H. Waters

[57] ABSTRACT

A dictating machine includes a recording and reading head for making and reading recordings on a magnetic strip. A reversible electric drive motor rotates a drive roller which engages the magnetic strip and moves the strip longitudinally past the head in alternate directions. A positioning device in the form of a shaft having an endless screwthread and driven by an electric drive motor serves to stop the head transversely of the direction of movement of the magnetic strip so that recordings on the strip are made and read along a series of longitudinal tracks. A detector switch is provided to ensure that each position of the head corresponds to a respective direction of movement of the strip. A control mechanism including a pair of photoelectric cells and respective lamps are used to detect the ends of the strip and to control the operation of the drive motor and/or the positioning device in response to the detection of an end of the strip whereby to reverse the direction of movement of the strip and/or initiate the stepping of the head into another position.

11 Claims, 4 Drawing Figures

DICTATING MACHINE USING A MULTI-TRACK MAGNETIC STRIP AND HAVING A PHASING CONTROL MEANS

BACKGROUND OF THE INVENTION

The invention relates to a recording machine such as a dictating machine and aims to provide a compact machine which is very simple to use for magnetic recordings on small magnetic strips and which can be operated by manipulating a single control element adapted for rapid switching between the operations of recording, playback, rewinding, stopping, and ejection of the magnetic strip.

SUMMARY OF THE INVENTION

In accordance with the present, there is provided a recording machine such as a dictating machine including: a recording and reading head for making and reading recordings on a magnetic strip; reversible drive means for moving the magnetic strip longitudinally past the head in alternate directions; and positioning means for stepping the head transversely of the direction of movement of head so that recordings on the magnetic strip are made and read along a series of longitudinal tracks, each position of the head corresponding to a respective direction of rotation; and control means for detecting the position of the magnetic strip, such control means being operative to control at least one of said drive means and said positioning means in response to the detected position of the magnetic strip.

BRIEF DESCRIPTION OF THE DRAWINGS

In order that the invention may be readily understood, an embodiment thereof will now be described in more detail, by way of example, with reference to the appended drawings, in which.

DESCRIPTION OF PREFERRED EMBODIMENT

Figure 1:
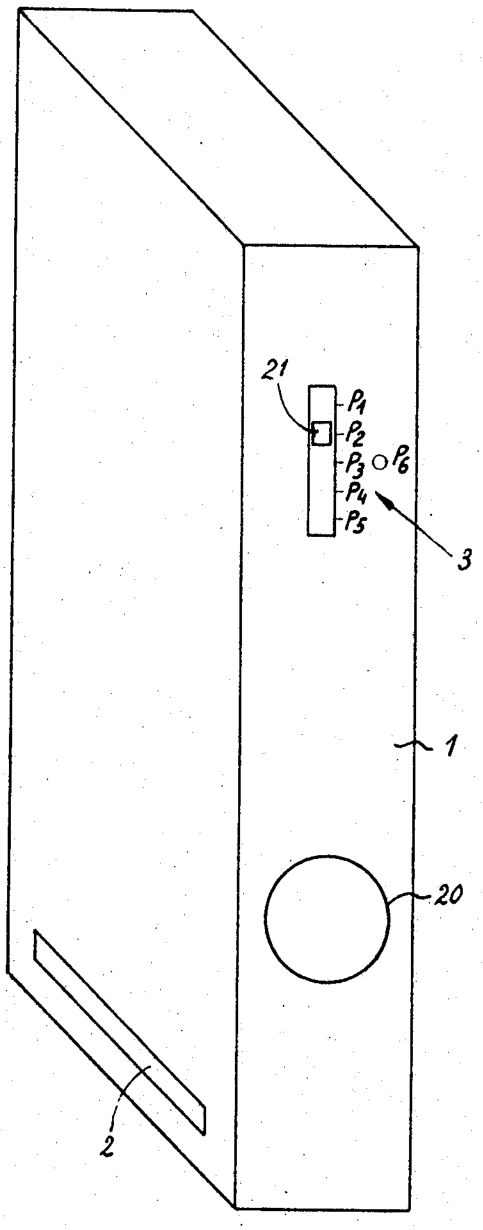
FIG. 1 is a perspective view of a dictating maching embodying the invention.

Referring firstly to FIG. 1, a dictating machine embodying the invention includes a casing 1 formed adjacent a lower edge of one of its surfaces with an elongated slot-shaped opening 2 through which a magnetic strip serving as a magnetic recording support can be introduced into the machine. The magnetic strip can also be discharged from the machine through the opening 2 when a user so wishes. A controller 3 including a control element in the form of a slider 21 which can be moved to various positions $P_1$ through $P_5$ is disposed near the top of an adjacent surface of the casing 1. The controller 3 will be described in more detail hereinafter.

The machine is constructed so that the user merely needs to insert the magnetic strip and manipulate the single control element 21 of the controller 3 which, as required, sets the machine in the condition for recording, playback, rewinding, rapid forward motion, stopping, or the ejection of the magnetic strip.

Figure 2:
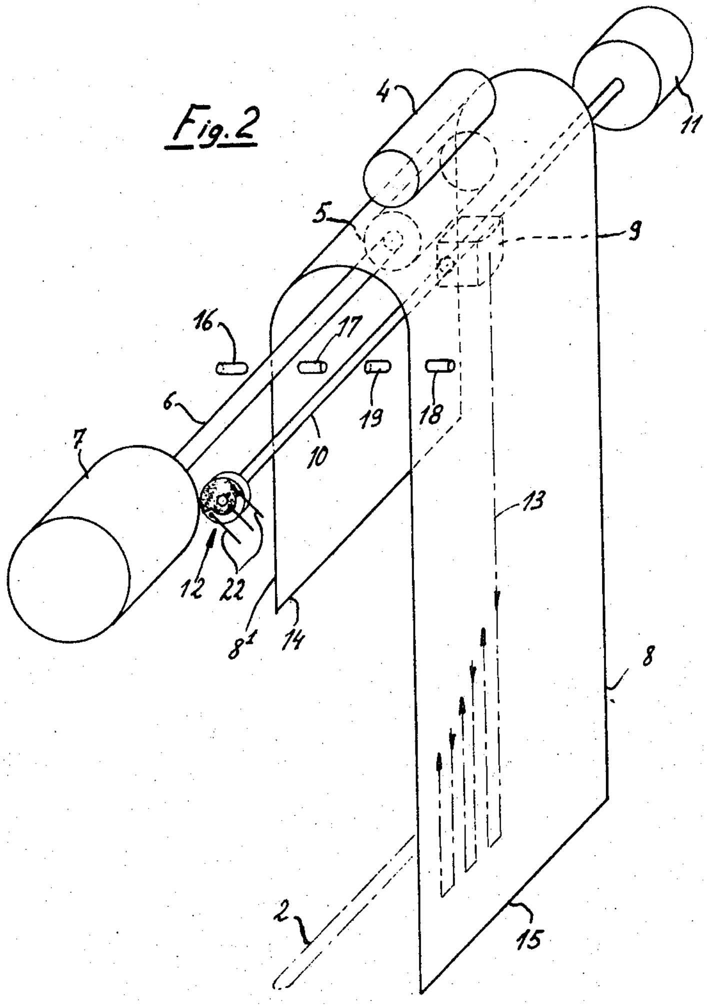
FIG. 2 shows a drive mechanism of the machine of the machine of FIG. 1.

Referring to FIG. 2, the magnetic strip is introduced into the machine upwards from the bottom of casing 1 through the slot 2 to engage in the nip between rollers 4 and 5. Drive roller 5 is secured to a shaft 6 rotatable by a motor 7 coupled thereto and pressure roller 4 is arranged to provide the necessary feed pressure. Rollers 4 and 5 deflect the magnetic strip which is guided in its path by suitable guide means (not shown) to form a descending run 8 so that the machine can be compact while ensuring that the length of the magnetic strip is sufficient.

Motor 7 is controllable to drive the magnetic strip backwards and forwards in the longitudinal direction of the strip past a magnetic recording and reading head 9 disposed between an ascending run $8^1$ of the strip and the descending run 8. The head 9 is arranged to be positioned transversely of the strip by a shaft 10 extending parallel to shaft 6, such shaft carrying an endless screw arranged to co-operate with the head 9 and being rotatable by an electric motor 11 coupled to one end of shaft 10. The shaft 10 carries at its other end a detector 12 which will be described in more detail hereinafter.

Head 9 is so driven by motor 11 that it takes up various stationary positions spaced apart transversely of the magnetic strip, thus defining on the magnetic strip a number of alternate forward and reverse magnetic tracks 13. Each stationary position of the head 9 corresponds to one direction of motion of the magnetic strip, any given position of head 9 always corresponding to the same direction of motion.

The reversal of the direction of motion and/or the movement of the head 9 into a new position corresponding to the new direction of motion of the strip is controlled by detecting the position of the ends 14 and 15 of the strip, using photoelectric cells 16 and 18 each cooperating with a respective lamp 17, 19, the lamps being disposed between the ascending and descending runs 8 and 8′ of the magnetic strip. Consequently the physical length of the magnetic recording strip does not have to be accurately fixed, since the recording tracks will always terminate at the same distance from the edge of the strip since the latter controls the reversal of the direction of motion.

The path of the magnetic strip is selected so as to obtain a small, portable machine.

An important feature of the machine is that means are provided for ensuring that the position of the head transversely of the magnetic strip and the direction of motion of the strip are always related to one another. This relationship is achieved by a servo-control relying on relative connections between the strip drive and head drive, which connections are established once for all, thus obtaining coherent recordings which are always compatible.

The operation of the machine of FIGS. 1 and 2 will now be described with reference to the circuit diagrams of FIGS. 3 and 4.

Figure 3:
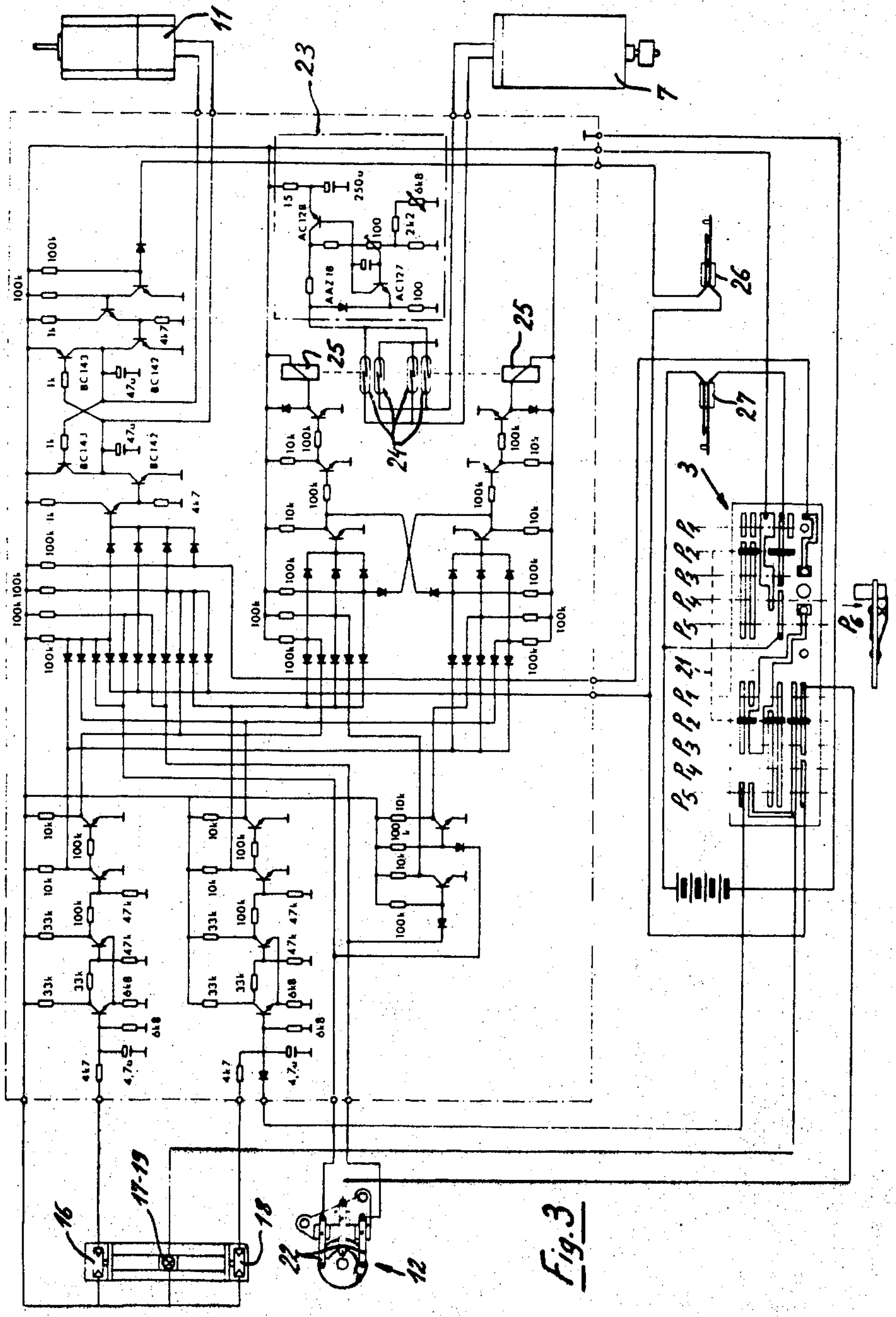
FIG. 3 shows control and logic circuitry of the machine of FIG. 1.

FIG. 3 illustrates control and logic circuitry of the machine which incorporates the controller 3, the change-over switch 12 and the photoelectric cells 16 and 18, such circuitry controlling the operation of drive motors 7 and 11.

Figure 4:
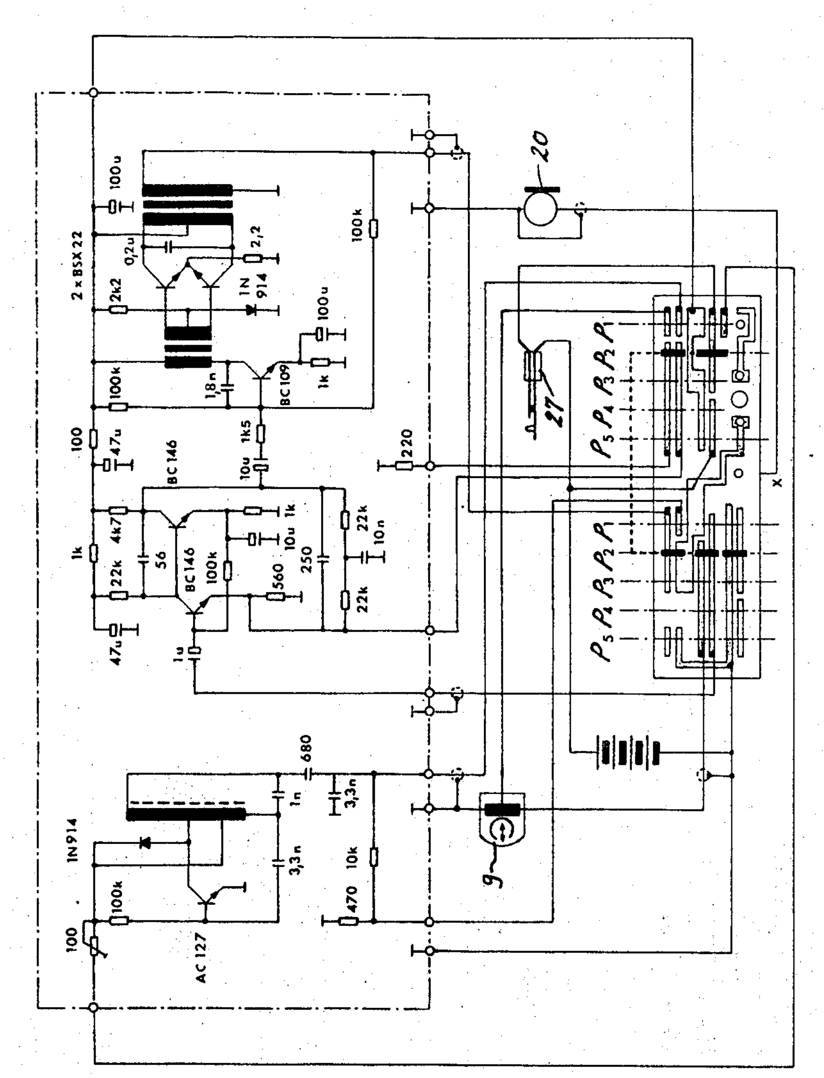
FIG. 4 shows the electronic recording and reproducing system of the machine.

FIG. 4 illustrates the electronic recording and reproducing system of the machine which incorporates the controller 3, the recording and reading head 9 and a microphone loud-speaker 20.

Referring firstly to FIG. 3, when the slider 21 of controller 3 is placed in the stop position $P_2$, the power supply of the machine is disconnected. When the slider 21 is placed in the recording position $P_1$ or in the playback position $P_3$, the machine is energized; however, assuming no magnetic strip has been introduced into the machine, the photoelectric cells 16 and 18 are both illuminated by their respective lamps 17 and 19 and the motor 7 for driving the magnetic strip remains inoperative.

When a magnetic strip is inserted into the machine through slot 2, the illumination of cell 16 is first interrupted. At this instant, cell 16 is dark and cell 18 is illuminated. Motor 7 can then be supplied by the electronic circuits of FIG. 3 so that it rotates in the desired direction for conveying the recording strip and moving it in front of the recording head 9, which is then in a position corresponding to the said desired direction of motion, which has been established once and for all and is determined by the position of the detector 12 which serves to detect the position of the head 9.

In the example shown, detector 12 is in the form of a trident-shaped three-way change-over switch 12, whose switching circuit 22 is connected to the shaft 10 which is driven by a motor 11 and is adapted to move the recording and reading head 9.

Each time shaft 10 rotates, switch 12 can assume two positions and should be constructed so as to connect switch 12 to the supply of motor 7, which will drive the magnetic recording strip 4 in the required direction, which has been determined once and for all so as to ensure that a given position of the head always coincides with a given direction of motion of the magnetic support, whose alternate tracks 13 should always be completely compatible with all the other recordings so that a position of the head always corresponds to the desired direction of rotation of the recording support.

A conventional electronic circuit such as shown by way of example in FIG. 3 is used to ensure that only weak currents flow in the blades of switch 12.

The speed of motor 7 is regulated by stage 23 of the circuitry of FIG. 3. Magnetic strip contacts 24 are arranged to determine the direction of rotation of motor 7 in response to the magnetic field of one of the two coils 25 which are energized in dependence upon the state of switch 12.

As can be seen, switch 12 also controls the energization of the motor 11 for driving head 9, the motor 11 being energized to drive the head as long as it does not occupy a position corresponding to the direction of motion of the magnetic recording strip.

When the magnetic strip reaches the end of its travel in the forward direction, i.e. when cell 16 is illuminated by the passing of edge 14 the magnetic strip and cell 18 is darkened by the magnetic strip, this combination of the states of cells 16 and 18 causes the drive motor 7 to be energized to drive the magnetic strip in the opposite direction.

Since the position of head 9 detected by switch 12 no longer corresponds to the direction of motion of the magnetic strip as imposed by motor 7, the motor 11 for positioning head 9 is energized and rotates until a coincidence is detected by the position of switch 12 which rotates with shaft 10. When a new position of the head 9 corresponding to the new direction of motion of the magnetic strip is detected by switch 12, motor 11 receives an order to stop. When the magnetic strip reaches the end of its travel in the said opposite direction, the direction of motion is again reversed, the edge 15 being detected by the illumination of photoelectric cell 18, and the cycle recommences.

The controller 3 acts simultaneously on the logic circuits of the circuitry of FIG. 3 and on the electronic recording and reproducing system of the machine which is shown diagrammatically in FIG. 4. In the position shown in FIG. 4, the contacts of slider 21 are in the stop position indicated under the position $P_2$ shown. Position $P_1$ shows the connections for recording, and position $P_3$ shows the connections for listening to the recording.

In position $P_4$ of the slider 21, motor 11 is energized in the opposite direction so as to move the head 9 partly or completely back to its starting position in order to locate a position in the recording. An abutment switch 26 disconnects motor 11 when the head has reached its starting position and cannot move back any further.

When position $P_3$ is selected, it is also possible to act on a switch $P_6$ (FIG. 3), which energizes motor 11 when it moves forwards in order to locate a position further ahead in the recording.

At the end of its travel in the forward direction, the head 9 acts on a switch 27 which cuts off the supply to motor 11, since the recording or reading head 9 has reached its extreme position and cannot move forward any further.

In position $P_5$ (reject - ejection), the motor 7 for driving the magnetic recording strip is energized and cell 18 is rendered inoperative so that when the edge 15 of the support passes in front of cell 18 motor 7 is no longer reversed by the resulting illumination of cell 18 and the magnetic strip is driven through the slot 2 in the casing so that it can be extracted. Another magnetic recording strip can then be introduced through the aperture 2 and can then darken cell 16, whereupon motor 7 is automatically energized, in the desired direction for driving the magnetic strip in the desired direction.

We claim:

1. A dictating machine for use with a magnetic strip and comprising a recording and reading head for making and reading recordings on the magnetic strip, reversible drive means for moving the magnetic strip longitudinally in front of the head in alternate directions, said strip having opposite edges and being engaged by said drive means to form a bend therein with parallel lengths, positioning means for stepwise movement of the head transversely of the direction of movement of the magnetic strip so that recordings in the magnetic strip are made and read along a series of longitudinal tracks, each stationary position of the head corresponding to a respective direction of movement of the strip and each position of the head always corresponding to the same direction of motion, control means for detecting the position of the magnetic strip, said control means being positioned to detect the absence and presence of both edges of the strip simultaneously, said control means being operative to control at least one of said drive means and said positioning means in response to the detected position of the magnetic strip, and means for ensuring that the position of the head and the direction of motion of the recording support are always related to one another and are servo-controlled due to predetermined relative connections therebetween.

2. A dictating machine as claimed in claim 1 including a casing provided adjacent a lower edge of one of its surfaces with an elongated slot-shaped opening through which a magnetic strip serving as a magnetic recording support can be introduced into the machine, a controller including a single control element in the form of a slider which can be moved to various positions, disposed near the top of an adjacent surface of the casing, said controller comprising means for setting the machine in conditions for recording, playback rewinding, fast forward movement, stopping, or the ejection of the magnetic strip.

3. A machine as claimed in claim 1, wherein said control means is operative to reverse the direction of movement of the magnetic strip.

4. A machine as claimed in claim 3, wherein said control means comprises photoelectric cells co-operating with respective light sources to detect the edges of the magnetic strip.

5. A machine as claimed in claim 4, wherein said reversible drive means includes a drive roller rotatable by a motor, and further including a casing provided with a slot through which the magnetic strip is introduced into driving engagement with said drive roller.

6. A machine as claimed in claim 5, wherein said drive roller is carried by a first shaft and said positioning means for the recording and reading head includes a second shaft extending parallel to said first shaft carrying the drive roller, a change-over switch mounted on said second shaft and capable of occupying two positions per revolution of the second shaft, said change-over switch being arranged to connect a power supply to the motor so that the position of the head always corresponds to the same direction of movement of the magnetic strip, the change-over switch also being connected to control the power supply to a motor of the positioning means so that such motor is energized to move the head until the head has been moved into a position corresponding to the direction of movement of the magnetic strip.

7. A machine as claimed in claim 6 in which the change-over switch also controls the energization of the motor for driving the head, the latter said motor being energized to drive the head when the head does not occupy a position corresponding to the direction of motion of the magnetic recording strip, and when the magnetic strip reaches the end of its travel in the forward direction with one photoelectric cell illuminated by the passing, of the edge of the magnetic strip and another cell is darkened by the magnetic strip, this combination of the states of cells causes the drive motor of the reversible driving means to be energized to drive the magnetic strip in the opposite direction in such a manner that since the position of the head detected by the change-over switch no longer corresponds to the direction of motion of the magnetic strip as imposed by the corresponding motor, the motor for positioning the head being energized until coincidence is detected by the position of the change-over switch which rotates with the second shaft and when a new position of the head corresponding to the new direction of motion of the magnetic strip is detected by said switch, said motor for driving the head receives an order to stop.

8. A machine as claimed in claim 7 wherein when the magnetic strip reaches the end of its travel in said opposite direction, the direction of motion is again reversed, the edge of the magnetic strip being detected by the illumination of a photoelectric cell and the cycle recommences.

9. A machine as claimed in claim 6, including a controller having a control position in which the positioning means is caused to move the head at least partly back towards a starting position of the head in order to locate a position in the recording, and limit means to stop the positioning means when the head reaches its said starting position.

10. A machine as claimed in claim 9, wherein the controller has a control position in which the motor of the reversible drive means for the magnetic strip is energized and one of the photoelectric cells is rendered inoperative so that when the edge of the magnetic strip passes said one photoelectric cell the reversible drive motor continues to drive the magnetic strip in the same direction thereby discharging such strip through the slot in the casing.

11. A machine as claimed in claim 6 wherein said second shaft includes a threaded portion on which said change-over switch is mounted.

* * * * *